United States Patent
Sato et al.

(10) Patent No.: US 10,381,832 B2
(45) Date of Patent: Aug. 13, 2019

(54) POWER CONVERSION APPARATUS, POWER MANAGEMENT APPARATUS, AND POWER MANAGEMENT METHOD

(71) Applicant: KYOCERA Corporation, Kyoto-shi, Kyoto (JP)

(72) Inventors: Yuri Sato, Kawasaki (JP); Kazutaka Nakamura, Yokohama (JP); Yuji Kakuda, Yokohama (JP); Yuki Suzuki, Yokohama (JP); Takashi Inoue, Zama (JP); Kentaro Kamei, Kyoto (JP)

(73) Assignee: KYOCERA Corporation, Kyoto (JP)

( * ) Notice: Subject to any disclaimer, the term of this patent is extended or adjusted under 35 U.S.C. 154(b) by 0 days.

(21) Appl. No.: 15/580,466

(22) PCT Filed: Jun. 8, 2016

(86) PCT No.: PCT/JP2016/067074
§ 371 (c)(1),
(2) Date: Dec. 7, 2017

(87) PCT Pub. No.: WO2016/199814
PCT Pub. Date: Dec. 15, 2016

(65) Prior Publication Data
US 2018/0145509 A1 May 24, 2018

(30) Foreign Application Priority Data
Jun. 8, 2015 (JP) .................................. 2015-115846

(51) Int. Cl.
*H02J 3/14* (2006.01)
*H02J 13/00* (2006.01)
(Continued)

(52) U.S. Cl.
CPC ................ *H02J 3/14* (2013.01); *G06F 1/189* (2013.01); *G06F 1/28* (2013.01); *H02J 3/383* (2013.01);
(Continued)

(58) Field of Classification Search
CPC .................................................... Y02E 10/563
See application file for complete search history.

(56) References Cited

U.S. PATENT DOCUMENTS 8,583,520 B1 11/2013 Forbes, Jr.
8,588,991 B1 11/2013 Forbes, Jr.
(Continued)

FOREIGN PATENT DOCUMENTS

JP 2013-207862 A 10/2013
JP 2014-171359 A 9/2014
(Continued)

OTHER PUBLICATIONS

International Search Report dated Jul. 19, 2016, issued by Japan Patent Office for International Application No. PCT/JP2016/067074.

*Primary Examiner* — Adam D Houston
(74) *Attorney, Agent, or Firm* — Procopio Cory Hargreaves and Savitch LLP

(57) ABSTRACT

A power conversion apparatus comprises a first communication unit configured to receive, from an external server, an output suppression message instructing output suppression of a dispersed power source; and a second communication unit configured to perform communication of a predetermined message having a predetermined format with a power management apparatus that manages power information of a consumer's facility. The predetermined format includes an information element capable of storing output suppression information related to the output suppression of the dispersed power source. The second communication unit is configured to transmit the predetermined message including the output suppression information as an information element to the power management apparatus.

14 Claims, 5 Drawing Sheets

(51) Int. Cl.
*H02S 40/32* (2014.01)
*G06F 1/18* (2006.01)
*G06F 1/28* (2006.01)
*H02J 3/38* (2006.01)
*H02J 3/46* (2006.01)
*H02J 1/00* (2006.01)

(52) U.S. Cl.
CPC ............ *H02J 13/00* (2013.01); *H02J 13/002* (2013.01); *H02S 40/32* (2014.12); *H02J 3/46* (2013.01); *H02J 2001/002* (2013.01); *Y02E 10/563* (2013.01); *Y02E 40/72* (2013.01); *Y02E 60/7815* (2013.01); *Y04S 10/123* (2013.01); *Y04S 40/121* (2013.01)

(56) References Cited

U.S. PATENT DOCUMENTS

| | | | |
|---|---|---|---|
| 8,855,829 B2 | 10/2014 | Golden et al. |
| 9,252,597 B2 | 2/2016 | Yumura et al. |
| 9,293,915 B2 | 3/2016 | Baba et al. |
| 9,300,156 B2 | 3/2016 | Nishibayashi et al. |
| 9,429,974 B2 | 8/2016 | Forbes, Jr. |
| 9,461,471 B2 | 10/2016 | Forbes, Jr. |
| 9,727,929 B2 | 8/2017 | Kubota et al. |
| 9,824,409 B2 | 11/2017 | Katayama et al. |
| 9,927,824 B2 | 3/2018 | Nakakita et al. |
| 2004/0070280 A1 | 4/2004 | Nakata et al. |
| 2010/0262312 A1 | 10/2010 | Kubota et al. |
| 2011/0046792 A1 | 2/2011 | Imes et al. |
| 2012/0078427 A1 | 3/2012 | Jang et al. |
| 2012/0089263 A1 | 4/2012 | Park et al. |
| 2012/0249048 A1 | 10/2012 | Nishibayashi et al. |
| 2012/0271476 A1 | 10/2012 | Parsonnet et al. |
| 2012/0296481 A1 | 11/2012 | Iwamoto et al. |
| 2013/0082640 A1 | 4/2013 | Nishibayashi et al. |
| 2013/0257384 A1 | 10/2013 | Nishibayashi et al. |
| 2014/0039703 A1 | 2/2014 | Forbes, Jr. |
| 2014/0042978 A1 | 2/2014 | Nishibayashi et al. |
| 2014/0077597 A1 | 3/2014 | Nishibayashi et al. |
| 2014/0084686 A1 | 3/2014 | Nishibayashi et al. |
| 2014/0142772 A1 | 5/2014 | Kubota et al. |
| 2014/0236377 A1 | 8/2014 | Joko |
| 2014/0288718 A1 | 9/2014 | Nishibayashi et al. |
| 2014/0336837 A1 | 11/2014 | Kiuchi et al. |
| 2016/0111880 A1 | 4/2016 | Terai |
| 2016/0209857 A1 | 7/2016 | Nakasone |
| 2017/0293869 A1 | 10/2017 | Suyama et al. |
| 2017/0324244 A1 | 11/2017 | Uenishi et al. |
| 2018/0212462 A1 | 7/2018 | Okino et al. |

FOREIGN PATENT DOCUMENTS

| | | |
|---|---|---|
| JP | 2014-187799 A | 10/2014 |
| JP | 2015-202022 A | 11/2015 |
| WO | 2014/057867 A1 | 4/2014 |

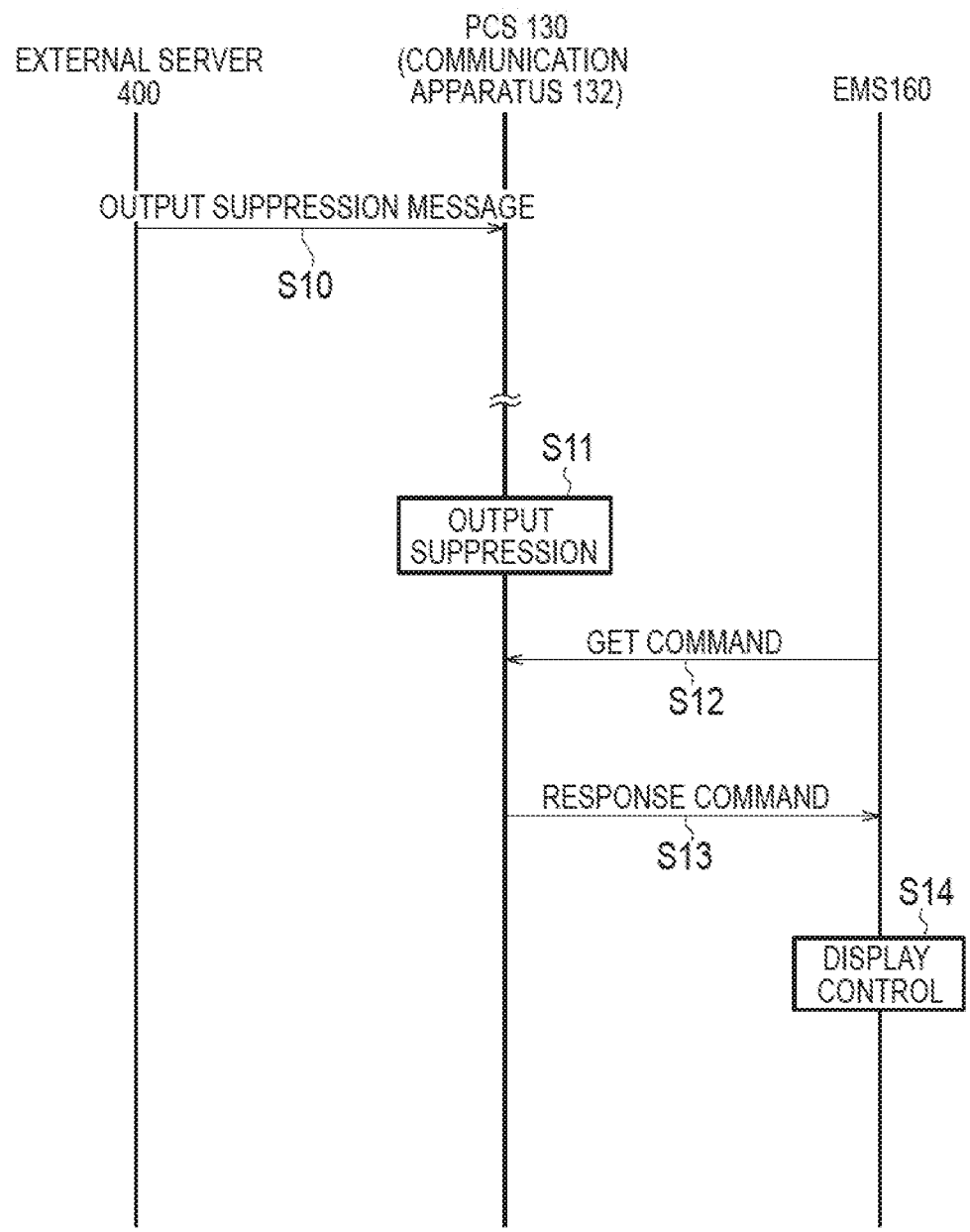

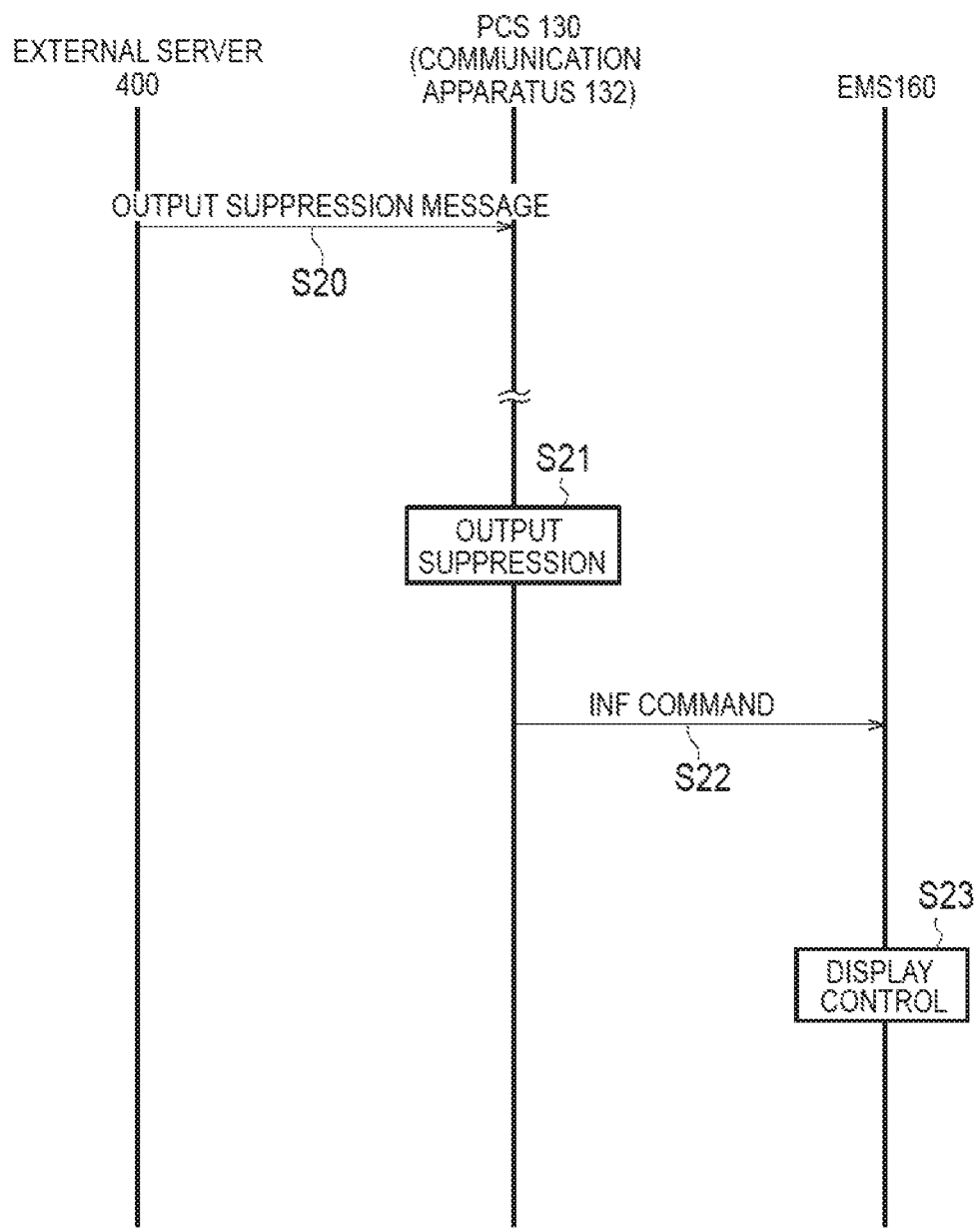

POWER CONVERSION APPARATUS, POWER MANAGEMENT APPARATUS, AND POWER MANAGEMENT METHOD

TECHNICAL FIELD

The present disclosure relates to a power conversion apparatus that receives an output suppression message for instructing output suppression of a dispersed power source from an external server, a power management apparatus that receives a predetermined message from a power conversion apparatus, and a power management method that receives an output suppression message for instructing output suppression of a dispersed power source from an external server.

BACKGROUND ART

A power conversion apparatus (power conditioner) connected to a dispersed power source that outputs DC power is known. The power conversion apparatus includes a direct current (DC) converter (a DC/DC converter) that converts a voltage of DC power input from a dispersed power source and an inverter that converts the DC power input from the DC converter into alternate current (AC) power (for example, see Patent Literature 1).

Here, the power conversion apparatus receives a message for instructing output suppression of the dispersed power source (hereinafter referred to as an "output suppression message") from a server of a power transmission and distribution company such as a power company or a distribution company (hereinafter referred to as an "external server") and suppress the output of the dispersed power source in accordance with the output suppression message.

CITATION LIST

Patent Literature

Patent Literature 1: Japanese application publication No. 2014-171359

SUMMARY

A power conversion apparatus according to a first aspect comprises a first communication unit configured to receive, from an external server, an output suppression message instructing output suppression of a dispersed power source; and a second communication unit configured to perform communication of a predetermined message having a predetermined format with a power management apparatus that manages power information of a consumer's facility. The predetermined format includes an information element capable of storing output suppression information related to the output suppression of the dispersed power source. The second communication unit is configured to transmit the predetermined message including the output suppression information as an information element to the power management apparatus.

A power management apparatus according to a second aspect comprises a controller configured to control a display apparatus such that power information indicating power in a consumer's facility is displayed; and a communication unit configured to perform communication of a predetermined message having a predetermined format with a power conversion apparatus that receives, from an external server, an output suppression message instructing output suppression of a dispersed power source. The predetermined format includes an information element capable of storing output suppression information related to the output suppression of the dispersed power source. The communication unit is configured to receive, from the power conversion apparatus, the predetermined message including the output suppression information as an information element. The controller is configured to perform display control for information related to the output suppression of the dispersed power source in accordance with the predetermined message including the output suppression information as the information element.

A power management method according to a third aspect comprises a step of receiving, by a power conversion apparatus, an output suppression message from an external server, the output suppression message instructing output suppression of a dispersed power source, the power conversion apparatus performing communication of a predetermined message having a predetermined format with a power management apparatus that manages power information indicating power in a consumer's facility; and a step of transmitting, by the power conversion apparatus, the predetermined message to the power management apparatus, the predetermined message including output suppression information related to the output suppression of the dispersed power source as an information element included in the predetermined format.

BRIEF DESCRIPTION OF DRAWINGS

FIG. 7 is a sequence diagram illustrating a power management method according to an embodiment.

FIG. 8 is a sequence diagram illustrating a power management method according to an embodiment.

DESCRIPTION OF EMBODIMENTS

Hereinafter, the embodiment will be described with reference to the drawings. Note that the same or similar reference signs are applied to the same or similar portions in the following descriptions of the drawings.

It must be understood that the drawings are schematic, and the ratio of each dimension and the like may differ from the real one. Accordingly, specific dimensions and the like should be understood with reference to the following description. Furthermore, it must be understood that, the relationship or ratio of dimensions included in each of the drawings may differ.

[Overview of Disclosure]

In recent years, a power management apparatus (an energy management system (EMS)) that manages power information indicating power in a consumer's facility has attracted attention. However, transmission of the output suppression message from the external server to the power conversion apparatus without going through the power management apparatus is under review, and in that case, the power management apparatus is unable to know an output suppression status of the dispersed power source.

A power conversion apparatus according to the overview of disclosure comprises a first communication unit configured to receive, from an external server, an output suppression message instructing output suppression of a dispersed power source; and a second communication unit configured to perform communication of a predetermined message having a predetermined format with a power management apparatus that manages power information of a consumer's facility. The predetermined format includes an information element capable of storing output suppression information related to the output suppression of the dispersed power source. The second communication unit is configured to transmit the predetermined message including the output suppression information as an information element to the power management apparatus.

In the overview of the disclosure, the second communication unit transmits a predetermined message including the output suppression information as an information element to the power management apparatus. Therefore, the power management apparatus can grasp the state of suppression the output of the distributed power source due to the control according to the output suppression message.

Embodiment (Power Management System)

A power management system according to an embodiment will be described below.

Figure 1:
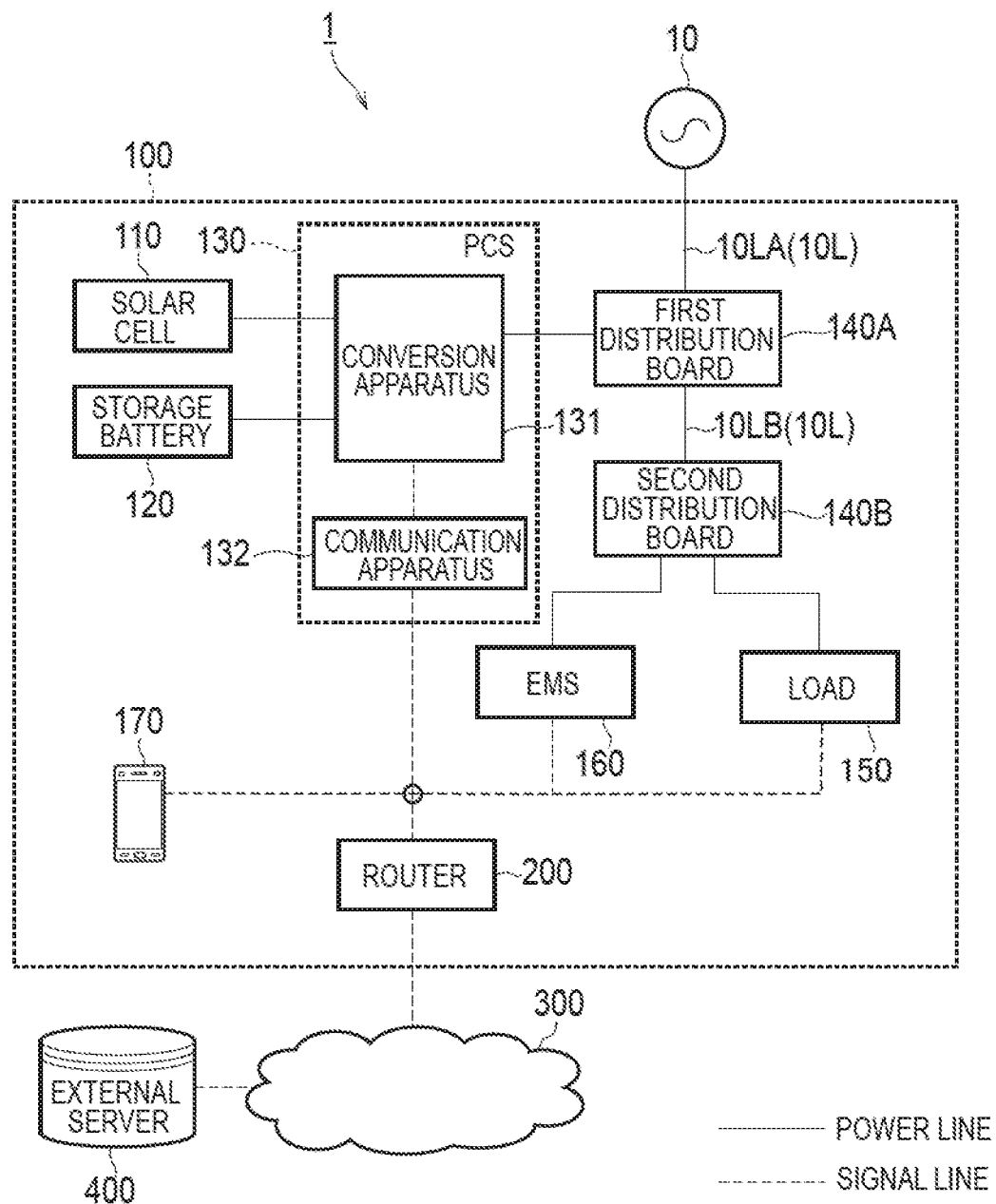
FIG. 1 is a diagram illustrating a power management system 1 according to an embodiment.

As illustrated in FIG. 1, the power management system 1 includes a consumer's facility 100 and an external server 400. The consumer's facility 100 includes a router 200. The router 200 is connected to the external server 400 via a network 300. The router 200 constitutes a local area network and is connected to each equipment (for example, a communication apparatus 132 of a PCS 130, a load 150, an EMS 160, and a display apparatus 170). In FIG. 1, a solid line indicates a power line, and a dotted line indicates a signal line. The present disclosure is not limited to this example, and a signal may be transmitted via power line.

The consumer's facility 100 includes a solar cell 110, a storage battery 120, the PCS 130, the distribution board 140, the load 150, the EMS 160, and the display apparatus 170.

The solar cell 110 is an apparatus that generates power in response to light reception. The solar cell 110 outputs the generated DC power. A power generation amount of the solar cell 110 varies depending on an amount of solar radiation radiated to the solar cell 110. The solar cell 110 is an example of a dispersed power source that operates in accordance with a message (output suppression message) for instructing output suppression of the dispersed power source.

Here, the output suppression of the dispersed power source refers to reducing the amount of power that reversely flows to a grid out of the power generated by the dispersed power source. The reducing of the amount of power that reversely flows includes setting the amount of power that reversely flows to zero. By reducing the amount of power that reversely flows, for example, it is possible to stabilize the grid. Further, the output suppression of the dispersed power source includes reducing the output (power generation or discharging) of the dispersed power source regardless of the reverse power flow. Thus, for example, it is possible to contribute to an increase in a power purchase amount in the consumer's facility or to reduce a gas purchase amount when the dispersed power source is a fuel cell.

The storage battery 120 is an apparatus that accumulates power. The storage battery 120 outputs the accumulated DC power. The storage battery 120 may operate in accordance with the output suppression message, but in an embodiment, an example in which the storage battery 120 need not operate in accordance with the output suppression message is described.

The PCS 130 is an example of a power conversion apparatus (a power conditioning system (PCS)) that converts DC power to AC power. In an embodiment, the PCS 130 includes a conversion apparatus 131 and a communication apparatus 132.

The conversion apparatus 131 converts the DC power input from the solar cell 110 to the AC power and converts the DC power input from the storage battery 120 into the AC power. Further, the conversion apparatus 131 converts the AC power supplied from a power grid 10 into the DC power. The conversion apparatus 131 is connected to a main power line 10L (here, a main power line 10LA and a main power line 10LB) connected to the power grid 10 via a first distribution board 140A and also connected to both the solar cell 110 and the storage battery 120. The main power line 10LA is a power line connecting the power grid 10 with the first distribution board 140A, and the main power line 10LB is a power line connecting the first distribution board 140A with a second distribution board 140B.

The communication apparatus 132 is connected to the conversion apparatus 131, receives various kinds of messages to be transmitted to the conversion apparatus 131, and transmits various kinds of messages supplied from the conversion apparatus 131. In communication between the communication apparatus 132 and the conversion apparatus 131, a protocol (for example, its own protocol) applied to the PCS 130 is used.

In an embodiment, the communication apparatus 132 is connected to the external server 400 via the router 200 and receives the output suppression message for instructing the output suppression of the dispersed power source from the router 200. The communication apparatus 132 and the external server 400 may communicate via a dedicated line or may communicate via a public communication line such as the Internet.

The communication apparatus 132 is connected to the EMS 160 via the router 200, and performs communication of a predetermined message having a predetermined format with the EMS 160. The predetermined format is not particularly limited, and for example, an ECHONET Lite scheme, an SEP 2.0 scheme, a KNX scheme, or the like can be used.

For example, the predetermined format is a format conforming to the ECHONET Lite scheme. In this case, the predetermined message may be a command that can include output suppression information related to the output suppression. Specifically, examples of the predetermined message include an SET command, a GET command, a response command to a GET command, and an INF command.

The SET command is a message for instructing a setting or an operation for the PCS 130. The GET command is a message for acquiring a status of the PCS 130. The response command is a message including information requested by the GET command. The INF command is a message for notifying of the status of the PCS 130. In an embodiment, the GET command is an example of a transmission request message for requesting transmission of a message from the PCS 130 to the EMS 160.

The distribution board 140 is connected to the main power line 10L. The distribution board 140 includes the first distribution board 140A and the second distribution board 140B. The first distribution board 140A is connected to the power grid 10 via the main power line 10LA and connected to the solar cell 110 and the storage battery 120 via the conversion apparatus 131. Further, the first distribution board 140A controls the power supplied from the conversion apparatus 131 and the power supplied from the power grid 10 such that the power flows to the main power line 10LB. The power flowing from the main power line 10LB is distributed to each equipment (here, the load 150 and the EMS 160) through the second distribution board 140B.

The load 150 is an apparatus that consumes the power supplied via the power line. For example, the load 150 includes an apparatus such as a refrigerator, a lighting, an air conditioner, a television, or the like. The load 150 may be a single apparatus or a plurality of apparatuses.

The EMS 160 is an apparatus (an energy management system (EMS)) that manages the power information indicating the power in the consumer's facility 100. The power in the consumer's facility 100 refers to power flowing in the consumer's facility 100, power purchased by the consumer's facility 100, power sold from the consumer's facility 100, or the like.

The EMS 160 may control a power generation amount of the solar cell 110, the charging amount of the storage battery 120 and a discharging amount of the storage battery 120. The EMS 160 may be configured integrally with the distribution board 140 or the PCS 130. The EMS 160 is an apparatus connected to the network 300, and the function of the EMS 160 may be provided through a cloud service via the network 300.

In an embodiment, the EMS 160 is connected to each equipment (for example, the communication apparatus 132 of the PCS 130 and the load 150) via the router 200, and performs communication of a predetermined message having a predetermined format with each equipment.

The EMS 160 is connected to the display apparatus 170 via the router 200 and communicates with the display apparatus 170. The EMS 160 may perform communication of a predetermined message having a predetermined format with the display apparatus 170. As described above, the predetermined format is, for example, a format conforming to the ECHONET Lite scheme.

The display apparatus 170 displays the power information indicating the power in the consumer's facility 100. Examples of the display apparatus 170 include a smartphone, a tablet, a digital television, and a dedicated terminal. The display apparatus 170 is connected to the EMS 160 in a wired or radio manner and communicates with the EMS 160. The display apparatus 170 may perform communication of a predetermined message having a predetermined format with the EMS 160. The display apparatus 170 receives data necessary for displaying the power information from the EMS 160.

The communication apparatus 132 is connected to the external server 400 via the network 300 through the router 200. The communication apparatus 132 is connected with the router 200 in a wired or radio manner, and the router 200 is connected with the communication apparatus 132 in a wired or radio manner.

The network 300 is a communication network connecting the EMS 160 with the external server 400. The network 300 may be the Internet. The network 300 may include a mobile communication network. Further, the network 300 may be a dedicated communication line or a general communication line. For example, when the output of the solar cell 110 is a predetermined output or more, the output suppression can be executed more reliably using a dedicated communication line as the network 300.

The external server 400 transmits the output suppression message indicating the output suppression of the dispersed power source. The external server 400 may transmit a message (a demand response (DR)) for instructing suppression of the power flow from the power grid 10.

The output suppression message includes a target output suppression level indicating a level of the output suppression of the dispersed power source (here, the solar cell 110). The target output suppression level is decided in accordance with an output certified as an output capability (for example, a rated output) of the PCS that controls the dispersed power source (hereinafter referred to as an "equipment certified output"). The target output suppression level may be indicated by an absolute value (for example, oo kW) decided in accordance with the equipment certified output, may be indicated by a relative value (for example, a decrease of oo kW) with respect to the equipment certified output, or may be indicated by a suppression proportion (for example, oo %) with respect to the equipment certified output. Further, the target output suppression level has been described using the equipment certified output but may be an equipment certified capacity [kWh].

When the output capability of the dispersed power source is different from the output capability of the PCS, a smaller one of the output capabilities is the equipment certified output. In a case in which a plurality of PCSs are installed, the equipment certified output is a sum of output capabilities of a plurality of PCSs.

In an embodiment, the output suppression message includes calendar information indicating a schedule of the output suppression of the dispersed power source. In the calendar information, the schedule of the output suppression of the dispersed power source may be set in units of 30 minutes. The calendar information may include a schedule of one day, a schedule of one month, or a schedule of one year.

In an embodiment, a predetermined period may be decided as a maximum period in which the output suppression of the dispersed power source is performed. For example, a predetermined time may be the number of days per year (a number-of-days rule) or may be a cumulative time per year (a cumulative time rule). More specifically, for example, the predetermined period may be 30 days per year (a 30 day rule) or may be 360 hours per year (a 360 hour rule). However, the predetermined period may not be decided (a designation rule). These rules are types of the output suppression of the dispersed power source according to the output suppression message.

(Communication Apparatus)

Figure 2:
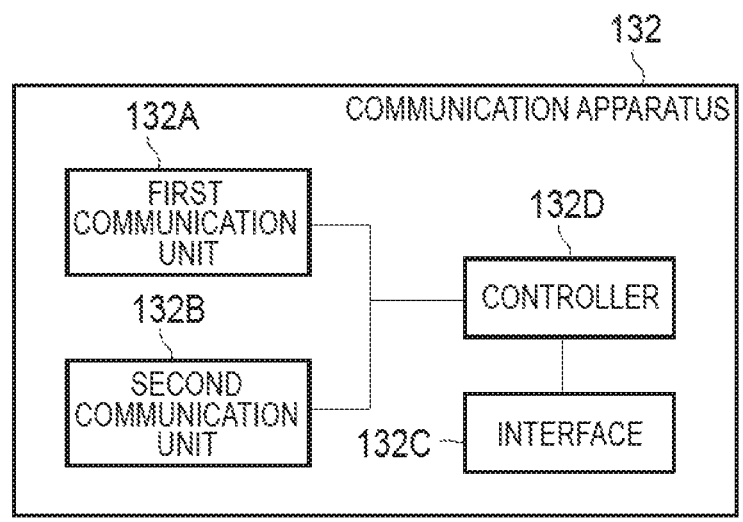
FIG. 2 is a diagram illustrating a communication apparatus 132 according to an embodiment.

The communication apparatus according to an embodiment will be described below. The communication apparatus 132 includes a first communication unit 132A, a second communication unit 132B, an interface 132C, and a controller 132D as illustrated in FIG. 2.

The first communication unit 132A receives the output suppression message for instructing the output suppression of dispersed power source from the external server 400. In an embodiment, the first communication unit 132A may receive the output suppression message from the external server 400 without going through the EMS 160.

The second communication unit 132B performs communication of a predetermined message having a predetermined format with the EMS 160. As described above, the predetermined format is, for example, a format conforming to the ECHONET Lite scheme. Here, the predetermined format used for communication between the communication apparatus 132 (the second communication unit 132B) and the EMS 160 may be different from a format used for communication between the communication apparatus 132 (the first communication unit 132A) and the external server 400. The predetermined format used for the communication between the second communication unit 132B (the second communication unit 132B) and the EMS 160 may be different from a format used for communication between the communication apparatus 132 (the interface 132C) and the conversion apparatus 131.

In an embodiment, the predetermined format includes an information element capable of storing the output suppression information related to the output suppression of the dispersed power source. The second communication unit 132B transmits a predetermined message including the output suppression information as the information element to the EMS 160. The transmission from the second communication unit 132B to the EMS 160 may be one-to-one communication (unicast) or broadcast (multicast).

Here, when the predetermined format is a format conforming to the ECHONET Lite scheme, the second communication unit 132B receives a transmission request message (the GET command) for requesting the EMS 160 to transmit a message as a predetermined message from the EMS 160. The second communication unit 132B may transmit a predetermined message (the INF command) including the output suppression information as the information element to the EMS 160 without depending on the transmission request message (the GET command). Alternatively, the second communication unit 132B may transmit a predetermined message (the response command) including the output suppression information as the information element to the EMS 160 in response to the transmission request message (the GET command).

The second communication unit 132B may periodically transmit a predetermined message to the EMS 160. Specifically, the periodic transmission may be transmission at predetermined intervals such as 30 minutes, one hour, or one day. The present disclosure is not limited thereto, and the second communication unit 132B may transmit a predetermined message having a predetermined format when connected to a network, when activated, or when reactivated.

A timing at which the second communication unit 132B transmits a predetermined message to the EMS 160 may be within a predetermined time (for example, 5 minutes, one hour, or the like) after the first communication unit 132A receives the output suppression message from the external server 400 or may be a timing at which a status change is recognized. The timing at which the status change is recognized may be, for example, a timing at which it corresponds to a status change announcement in the ECHONET Lite standard. More specifically, when a predetermined value (for example, a value related to the output suppression) changes, a predetermined message may be broadcasted or broadcast within a predetermined domain. Further, the timing at which the second communication unit 132B transmits the predetermined message to the EMS 160 may be a predetermined time (for example, 30 minutes, one hour, or the like) before content of the output suppression message is actually executed after the output suppression message is received from the external server 400.

When a date and time at which the output suppression information is updated is known, a predetermined message may be acquired from the second communication unit 132B using the transmission request message from the EMS 160 in accordance with the date and time. Since the output suppression information may include a next update date and time, the EMS 160 can know the date and time at which the output suppression information is updated.

Furthermore, when the second communication unit 132B transmits a predetermined message to the EMS 160, the predetermined message may be transmitted to the external server 400 together. The transmission to the external server 400 may be simultaneous or may be performed with a time difference. Since the predetermined message is transmitted to the external server 400 as described above, the external server 400 can confirm the identity between the output suppression message transmitted by the external server 400 and the predetermined message.

In an embodiment, the output suppression information includes at least one information piece among a plurality of information pieces (A) to (F) to be described below. Since the output suppression information includes two or more information pieces, the EMS 160 can know the status of the PCS 130 in further detail. The following information piece is not limited to being included as the output suppression information and is preferably included as the information element.

(A) The output suppression information includes information specifying a period in which the output suppression of dispersed power source is performed. Particularly, the output suppression information may include a start time at which the output suppression of the dispersed power source starts and an end time at which the output suppression of the dispersed power source ends. Alternatively, the output suppression information may include a start time at which the output suppression of the dispersed power source starts and a continuation period in which the output suppression of the dispersed power source is continued. Alternatively, the output suppression information may be information indicating whether or not a transmission timing (current time) of a predetermined message is within the period in which the output suppression of the dispersed power source is performed.

Here, the communication apparatus 132 may be able to specify the period in which the output suppression of the dispersed power source is performed on the basis of the calendar information included in the output suppression message.

(B) The output suppression information includes information indicating whether or not the output of dispersed power source is actually suppressed in accordance with the output suppression message. The information indicating whether or not the output of dispersed power source is actually suppressed may be information of informing of whether or not the output suppression is in progress or whether or not the output of the dispersed power source such as a cumulative amount in which the output suppression has been performed is actually suppressed directly or indirectly.

Here, even in the period in which the output suppression of the dispersed power source is performed, the level of the output of the dispersed power source may be the target output suppression level or less due to the relation such as the solar radiation amount. In this case, the output of the dispersed power source may not be actually suppressed. As described above, when the output level of the dispersed power source is the target output suppression level of the output suppression or less, the output suppression information is an output suppression execution time zone but may include information indicating that the output suppression is not actually performed.

In an embodiment, the PCS 130 is a multi-PCS that controls the output of the solar cell 110 and the output of the storage battery 120. Therefore, in a case in which control of charging the generated power of the solar cell 110 to the storage battery 120 is performed without increasing the output of the PCS 130, the output of the PCS 130 may be less than the target output suppression level. In this case, the output of the solar cell 110 may not be actually performed.

In an embodiment, since the PCS 130 is a multi-PCS, when control of charging the power generated by the solar cell 110 in the storage battery 120 is performed while performing the output suppression, the output suppression information includes information indicating whether or not the solar cell 110 charges the power which is to undergo the output suppression in the storage battery 120. Specifically, the output suppression information includes information indicating that the solar cell 110 charges the power which is to undergo the output suppression in the storage battery 120, information indicating that the solar cell 110 is scheduled to charge the power which is to undergo the output suppression in the storage battery 120, information indicating that the solar cell 110 does not charge the power which is to undergo the output suppression in the storage battery 120, information indicating that the solar cell 110 is not scheduled to charge the power which is to undergo the output suppression in the storage battery 120, and information indicating that the solar cell 110 is scheduled to stop charging the power which is to undergo the output suppression in the storage battery 120. Further, when the output suppression information is transmitted from the communication apparatus 132 (the second communication unit 132B) to the EMS 160, information related to the storage capacity of the storage battery 120 may be transmitted together. The information related to the storage capacity includes, for example, a current storage capacity, a storable capacity, or the like.

(C) The output suppression information includes information specifying an amount of output suppression of the dispersed power source (hereinafter a "suppression amount"). Specifically, the information specifying the suppression amount may be indicated by a relative value (for example, suppression of oo kW) with respect to the equipment certified output or may be indicated by a suppression proportion (for example, oo %) with respect to the equipment certified output. Alternatively, the information specifying the suppression amount may be indicated by a relative value (for example suppression of oo kW) with respect to the maximum power generation amount, a suppression proportion (for example, oo %) with respect to the maximum power generation amount. The maximum power generation amount means a power generation amount which can be output by the dispersed power source when the output suppression of the dispersed power source is not performed in accordance with the output suppression message. For example, when the solar cell 110 is controlled in accordance with maximum power point tracking (MPPT) control, the maximum power generation amount is a power generation amount of the solar cell 110 at an optimum operation point.

(D) The output suppression information includes information indicating whether or not the level of the output of the dispersed power source reaches the target output suppression level. Here, since a speed at which the output of the dispersed power source is suppressed is decided in advance, even when the output suppression of the dispersed power source is started, the level of the output of the dispersed power source does not immediately reach the target output suppression level.

(E) The output suppression information includes information indicating the target output suppression level indicating the level of the output suppression of the dispersed power source. Here, the target output level may be included in the output suppression message as described above.

(F) The output suppression information includes the calendar information indicating the schedule of the output suppression for the dispersed power source.

The interface 132C is an interface with the conversion apparatus 131. The interface 132C may be a wired interface or a radio interface. In the communication between the communication apparatus 132 and the conversion apparatus 131, a protocol (for example, its own protocol) applied to the PCS 130 is used.

The controller 132D includes a memory and a CPU and controls the communication apparatus 132. For example, the controller 132D controls the output of the dispersed power source in accordance with the output suppression message by controlling the conversion apparatus 131 using the interface 132C. The controller 132D acquires the state of the conversion apparatus 131 (for example, the power generation amount of the solar cell 110, the storage amount of the storage battery 120, and the discharging amount of the storage battery 120) from the conversion apparatus 131 uses the interface 132C. The controller 132D generates a command for controlling the conversion apparatus 131 on the basis of a predetermined message received from the EMS 160 and outputs the generated command to the conversion apparatus 131 using the interface 132C.

(Power Management Apparatus)

Figure 3:
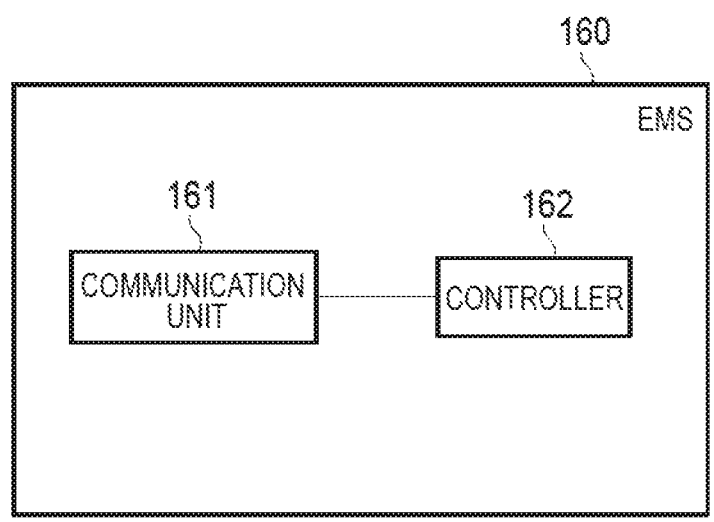
FIG. 3 is a diagram illustrating an EMS 160 according to an embodiment.

The power management apparatus according to an embodiment will be described below. The EMS 160 includes a communication unit 161 and a controller 162 as illustrated in FIG. 3.

The communication unit 161 performs communication of a predetermined message having a predetermined format with the communication apparatus 132. As described above, the predetermined format is, for example, a format conforming to the ECHONET Lite scheme.

The controller 162 includes a memory and a CPU and controls the EMS 160. The controller 162 may control the power generation amount of the solar cell 110, the charging amount of the storage battery 120, and the discharging amount of the storage battery 120.

In an embodiment, the controller 162 controls the display apparatus 170 such that the power information indicating the power in the consumer's facility 100 is displayed. The controller 162 performs display control for information related to the output suppression of the dispersed power source in accordance with a predetermined message including the output suppression information as the information element. The controller 162 performs at least one display control among a plurality of display controls (A) to (F) to be described below.

(A) In a case in which the output suppression information includes the information specifying the period in which the output suppression of the dispersed power source is performed, the controller 162 performs control such that the information specifying the period in which the output suppression of the dispersed power source is performed is displayed.

(B) In a case that in which the output suppression information includes the information indicating whether or not the output of the dispersed power source is actually suppressed in accordance with the output suppression message, the controller 162 performs control such that the information indicating whether or not the output of the dispersed power source is actually suppressed is displayed.

(C) In a case in which the output suppression information includes the information specifying the amount of the output suppression of the dispersed power source (the suppression amount), the controller 162 performs control such that the information specifying the suppression amount is displayed.

(D) In a case in which the output suppression information includes the information indicating whether or not the level of the output of the dispersed power source reaches the target output suppression level, the controller 162 performs control such that the information indicating whether or not the level of the output of the dispersed power source reaches the target output suppression level is displayed.

Specifically, when the level of the output of the dispersed power source does not reach the target output suppression level, the controller 162 displays various kinds of information (the information specifying the period in which the output suppression is performed, a character string "output suppression in progress," and the information specifying the suppression amount) in a first mode (for example, blinking). On the other hand, when the level of the output of the dispersed power source reaches the target output suppression level, the controller 162 displays various kinds of information (the information specifying the period in which the output suppression is performed, a character string "output suppression in progress," and the information specifying the suppression amount) in a second mode (for example, lighting). Of course, the second mode is different from the first mode. The first mode and the second mode may be the same mode (for example, only one of blinking and lighting).

(E) In a case in which the output suppression information includes the information indicating the target output suppression level, the controller 162 performs control such that the target output suppression level is displayed.

(F) In a case in which the output suppression information includes the calendar information, the controller 162 performs control such that the calendar information is displayed.

(Message Format)

A message format according to an embodiment will be described below. Here, the predetermined format is assumed to be a format conforming to the ECHONET Lite scheme.

Figure 4:
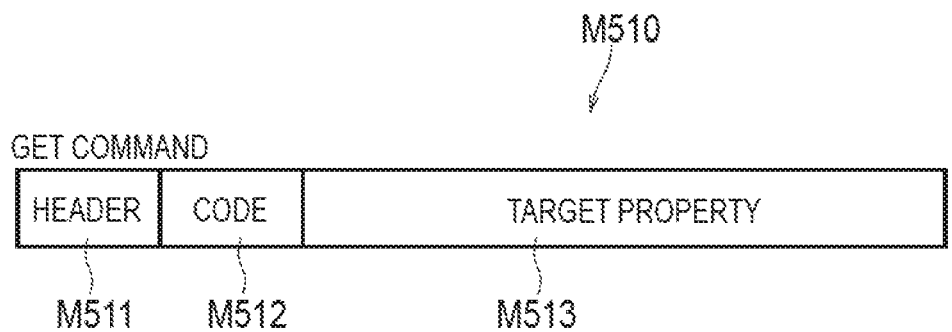
FIG. 4 is a diagram illustrating an example of a predetermined message according to an embodiment.

A GET command M510 includes a header M511, a code M512, and a target property M513 as illustrated in FIG. 4. In an embodiment, the GET command M510 is an example of the transmission request message for requesting the EMS 160 to transmit a message and is an example of a message transmitted from the EMS 160 to the communication apparatus 132.

The header M511 is information indicating the destination or the like of the GET command M510. The code M512 is information indicating a type of message including the code M512. Here, the code M512 is information indicating that the message including the code M512 is the GET command. The target property M513 is information indicating target content that the EMS 160 desires to know. The target property M513 is an information element capable of storing information for requesting transmission of the output suppression information.

Figure 5:
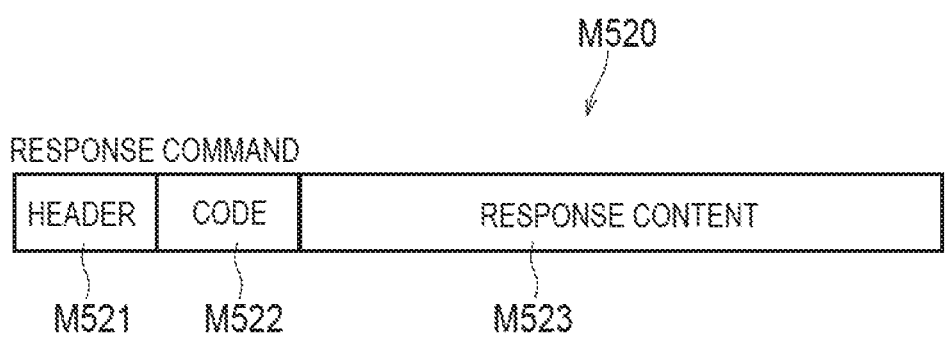
FIG. 5 is a diagram illustrating an example of a predetermined message according to an embodiment.

A response command M520 includes a header M521, a code M522, and a response content M523 as illustrated in FIG. 5. In an embodiment, the response command is an example of the predetermined message including the output suppression information as the information element and is transmitted from the communication apparatus 132 to the EMS 160 in accordance with the transmission request message (the GET command).

The header M521 is information indicating the destination or the like of the response command M520. The code M522 is information indicating a type of message including the code M522. Here, the code M522 is information indicating that the message including the code M522 is the response command. The response content M523 is information indicating content requested by the GET command. The response content M523 is an information element capable of storing the output suppression information.

Figure 6:
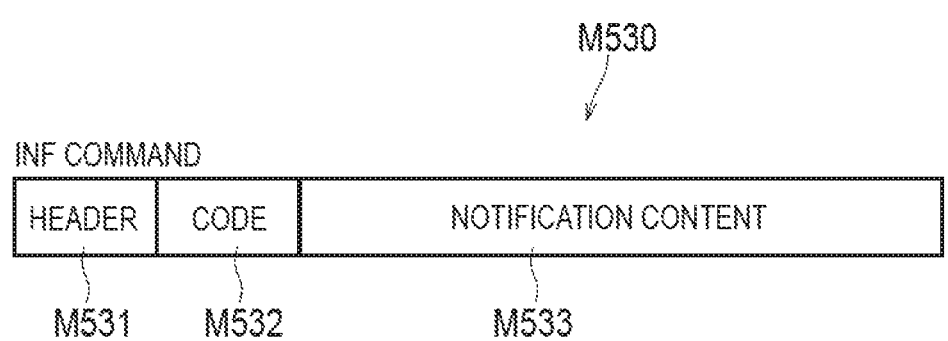
FIG. 6 is a diagram illustrating an example of a predetermined message according to an embodiment.

The INF command M530 includes a header M531, a code M532, and a notification content M533 as illustrated in FIG. 6. In an embodiment, the INF command is an example of the predetermined message including the output suppression information as the information element and is transmitted from the communication apparatus 132 to the EMS 160 without depending on the transmission request message (the GET command).

The header M531 is information indicating the destination or the like of the INF command M530. The code M532 is information indicating a type of message including the code M532. Here, the code M532 is information indicating that the message including the code M532 is the INF command. The notification content M533 is information indicating content to be reported to the EMS 160. The notification content M533 is an information element capable of storing the output suppression information.

(Power Management Method)

A power management method according to an embodiment will be described below. Here, the predetermined format used for the communication between the communication apparatus 132 and the EMS 160 is assumed to be a format conforming to the ECHONET Lite scheme.

Firstly, the description will proceed with an example in which the predetermined message including the output suppression information as the information element is the response command transmitted in accordance with the GET command will be described.

As illustrated in FIG. 7, in step S10, the communication apparatus 132 receives the output suppression message from the external server 400 without going through the EMS 160.

In step S11, the communication apparatus 132 performs the output suppression of the dispersed power source in accordance with the output suppression message.

In step S12, the EMS 160 transmits the GET command to the communication apparatus 132. The EMS 160 may periodically transmit the GET command to the communication apparatus 132. The GET command includes the information for requesting the transmission of the output suppression information as the information element.

In step S13, the communication apparatus 132 transmits the response command to the EMS 160 in accordance with the GET command. The response command is a predetermined message including the output suppression information as the information element.

In step S14, the EMS 160 performs display control for the information related to the output suppression of the dispersed power source in accordance with the response command.

Secondly, the description will proceed with an example in which the predetermined message including the output suppression information as the information element is the response command transmitted without depending on the GET command.

As illustrated in FIG. 8, in step S20, the communication apparatus 132 receives the output suppression message from the external server 400 without going through the EMS 160.

In step S21, the communication apparatus 132 performs the output suppression of the dispersed power source in accordance with the output suppression message.

In step S22, the communication apparatus 132 transmits the INF command to the EMS 160 without depending on the GET command. The communication apparatus 132 may periodically transmit the INF command in the period in which the output suppression of the dispersed power source is performed. The INF command is the predetermined message including the output suppression information as the information element.

In step S23, the EMS 160 performs display control for the information related to the output suppression of the dispersed power source in accordance with the INF command.

(Operations and Effects)

In an embodiment, the communication apparatus 132 transmits the predetermined message including the output suppression information as the information element to the EMS 160. Therefore, the EMS 160 can know the status of the output suppression of the dispersed power source associated with the control according to the output suppression message.

Other Embodiments

Although the present disclosure has been described with reference to the above-described embodiments, the description and the drawings constituting a part of this disclosure should not be interpreted to limit the present disclosure. Various alternative embodiments, examples, and operational techniques will be apparent to those skilled in the art from this disclosure.

In the embodiment, the solar cell 110 has been described as an example of the dispersed power source operating in accordance with the output suppression message. However, the dispersed power source is not limited to this example. The dispersed power source may be an apparatus that generates power using natural energy such as wind power or geothermal power. Alternatively, the dispersed power source may be a fuel cell that generates electrical power using fuel gas.

In the embodiment, the example in which the predetermined format used for the communication between the communication apparatus 132 and the EMS 160 is a format conforming to the ECHONET Lite scheme has been described. However, the embodiment is not limited to this example. The predetermined format may be a format standardized as a format used in the consumer's facility 100.

In the embodiment, the conversion apparatus 131 and the communication apparatus 132 are separately installed, but the embodiment is not limited to this example. The functions of the communication apparatus 132 may be installed in the conversion apparatus 131.

In the embodiment, the PCS 130 (multi-PCS) for controlling the output of the solar cell 110 and the output of the storage battery 120 has been described. However, the embodiment is not limited to this example. The PCS 130 may be an equipment that controls only the output of at least one of the solar cell 110, the storage battery 120, and the fuel cell.

Further, when the second communication unit 132B transmits the predetermined message including the output suppression information as the information element to the EMS 160, the second communication unit 132B may transmit authentication information of the PCS 130 together. As the authentication information, information identifying an individual of the PCS 130 (for example, an ID), a specific password, or the like may be used. When the authentication information is transmitted together, security can be improved.

In the embodiment, the first communication unit 132A and the second communication unit 132B are separate members, but the first communication unit 132A and the second communication unit 132B may be integrated. In other words, the first communication unit 132A may double as the second communication unit 132B.

The output suppression of the dispersed power source is performed by the PCS 130. Therefore, the output suppression of the dispersed power source can be considered as the output suppression of the PCS 130.

This application claims the benefit of Japanese Priority Patent Application No. 2015-115846 filed Jun. 8, 2015, the entire contents of which are incorporated herein by reference.

The invention claimed is:

1. A power conversion apparatus, comprising:
   a first communicator configured to receive, from an external server, an output suppression message instructing output suppression of a dispersed power source; and
   a second communicator configured to perform communication of a predetermined message having a predetermined format with a power management apparatus that manages power information of a facility,
   wherein the predetermined format includes an information element capable of storing output suppression information related to the output suppression of the dispersed power source, and
   the second communicator is configured to transmit the predetermined message including the output suppression information as an information element to the power management apparatus.

2. The power conversion apparatus according to claim 1, wherein the output suppression information includes information specifying a period in which the output suppression of the dispersed power source is performed.

3. The power conversion apparatus according to claim 1, wherein the output suppression information includes information indicating whether or not an output of the dispersed power source is actually suppressed in accordance with the output suppression message.

4. The power conversion apparatus according to claim 1, wherein the output suppression information includes information specifying an amount of the output suppression of the dispersed power source.

5. The power conversion apparatus according to claim 1, wherein the output suppression message includes a target output suppression level indicating a level of the output suppression of the dispersed power source, and
   the output suppression information includes information indicating whether or not an output of the dispersed power source reaches the target output suppression level.

6. The power conversion apparatus according to claim 1, wherein the output suppression information includes information indicating a target output suppression level indicating a level of the output suppression of the dispersed power source.

7. The power conversion apparatus according to claim 1, wherein the output suppression information includes calendar information indicating a schedule of the output suppression of the dispersed power source.

8. The power conversion apparatus according to claim 1, wherein the second communicator is configured to receive, from the power management apparatus, a transmission request message requesting transmission of a message as the predetermined message to the power management apparatus.

9. The power conversion apparatus according to claim 8, wherein the second communicator is configured to transmit, to the power management apparatus, the predetermined message including the output suppression information as an information element without depending on the transmission request message.

10. The power conversion apparatus according to claim 8, wherein the second communicator is configured to transmit, to the power management apparatus, the predetermined message including the output suppression information as an information element in accordance with the transmission request message.

11. The power conversion apparatus according to claim 1, wherein the predetermined format used for communication between the second communicator and the power management apparatus is different from a format used for communication between the first communicator and the external server.

12. The power conversion apparatus according to claim 1, wherein the dispersed power source includes at least both a solar cell and a storage battery,
power generated by the solar cell is able to be charged in the storage battery, and
the information element includes information indicating whether or not the power generated by the solar cell is charged in the storage battery.

13. A power management apparatus, comprising:
a controller configured to control a display apparatus such that power information indicating power in a facility is displayed; and
a communicator configured to perform communication of a predetermined message having a predetermined format with a power conversion apparatus that receives, from an external server, an output suppression message instructing output suppression of a dispersed power source,
wherein the predetermined format includes an information element capable of storing output suppression information related to the output suppression of the dispersed power source,
the communicator is configured to receive, from the power conversion apparatus, the predetermined message including the output suppression information as an information element, and
the controller is configured to perform display control for information related to the output suppression of the dispersed power source in accordance with the predetermined message including the output suppression information as the information element.

14. A power management method, comprising:
a step of receiving, by a power conversion apparatus, an output suppression message from an external server, the output suppression message instructing output suppression of a dispersed power source, the power conversion apparatus performing communication of a predetermined message having a predetermined format with a power management apparatus that manages power information indicating power in a facility; and
a step of transmitting, by the power conversion apparatus, the predetermined message to the power management apparatus, the predetermined message including output suppression information related to the output suppression of the dispersed power source as an information element included in the predetermined format.

* * * * *